US012053985B2

(12) United States Patent
Tanaka

(10) Patent No.: US 12,053,985 B2
(45) Date of Patent: Aug. 6, 2024

(54) LIQUID DISCHARGE HEAD AND METHOD FOR MANUFACTURING THE SAME

(71) Applicant: BROTHER KOGYO KABUSHIKI KAISHA, Nagoya (JP)

(72) Inventor: Taiki Tanaka, Yokkaichi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 142 days.

(21) Appl. No.: 17/720,557

(22) Filed: Apr. 14, 2022

(65) Prior Publication Data

US 2022/0348015 A1 Nov. 3, 2022

(30) Foreign Application Priority Data

Apr. 28, 2021 (JP) ................................ 2021-076286

(51) Int. Cl.
*B41J 2/14* (2006.01)
*B41J 2/16* (2006.01)

(52) U.S. Cl.
CPC ......... *B41J 2/14201* (2013.01); *B41J 2/1607* (2013.01); *B41J 2/1623* (2013.01)

(58) Field of Classification Search
CPC .... B41J 2/14201; B41J 2/1607; B41J 2/1623; B41J 2002/14491; B41J 2/161; B41J 2/1646; B41J 2002/14241; B41J 2/14233; B41J 2/1626; B41J 2/1631
See application file for complete search history.

(56) References Cited

U.S. PATENT DOCUMENTS

2019/0291437 A1* 9/2019 Kakiuchi ............... B41J 2/1623
2020/0061991 A1* 2/2020 Fukuda ................ B41J 2/14233

FOREIGN PATENT DOCUMENTS

JP 2020-32713 A 3/2020

* cited by examiner

*Primary Examiner* — Lisa Solomon
(74) *Attorney, Agent, or Firm* — Merchant & Gould P.C.

(57) ABSTRACT

A liquid discharge head includes: a flow passage substrate which is formed with individual flow passages, the individual flow passages including nozzles and pressure chambers communicated with the nozzles respectively; actuators which are fixed to a surface of the flow passage substrate and which overlap with the pressure chambers respectively in an orthogonal direction; and a protective substrate which is fixed to the surface and which covers the actuators. The protective substrate has at least one wall portion for defining actuator accommodating chambers which accommodate the actuators respectively. The wall portion overlaps in the orthogonal direction with a partition wall for partitioning two pressure chambers in the flow passage substrate. The wall portion is adhered to the surface via an adhesive portion. A protective film is formed at portions of the protective substrate and the adhesive portion which define the actuator accommodating chambers.

17 Claims, 11 Drawing Sheets

LIQUID DISCHARGE HEAD AND METHOD FOR MANUFACTURING THE SAME

CROSS REFERENCE TO RELATED APPLICATIONS

The present application claims priority from Japanese Patent Application No. 2021-076286, filed on Apr. 28, 2021, the disclosure of which is incorporated herein by reference in its entirety.

BACKGROUND

The present invention relates to a liquid discharge head in which a protective substrate has wall portions for defining a plurality of actuator accommodating chambers, and a method for manufacturing the same.

Conventionally, a liquid jetting head, which is provided with a protective substrate, is known. In such a liquid jetting head, the protective substrate has support portions (wall portions) each of which is provided for defining an actuator accommodating chamber for each of piezoelectric elements (actuators). The support portion is overlapped in the Z direction (orthogonal direction) with a partition wall which partitions two pressure chambers in a pressure chamber substrate. Further, the support portion is adhered to the pressure chamber substrate by means of an adhesive intervening therebetween.

SUMMARY

In the case of the liquid jetting head as described above, the support portion (wall portion) of the protective substrate is overlapped in the Z direction (orthogonal direction) with the partition wall of the pressure chamber substrate, and thus it is possible to suppress the structural crosstalk (phenomenon in which the vibration caused by the deformation of a certain actuator is transmitted to another actuator adjacent to the concerning actuator). However, any moisture (water content) may enter the interior of the actuator accommodating chamber from the outside of the protective substrate via the adhesive disposed between the wall portion of the protective substrate and the flow passage substrate, and the actuator may be destroyed by the moisture.

An object of the present teaching is to provide a liquid discharge head which makes it possible to realize both of the suppression of the structural crosstalk and the suppression of the invasion of moisture into the actuator accommodating chamber, and a method for manufacturing the same.

According to a first aspect of the present teaching, there is provided a liquid discharge head including:

a flow passage substrate which is formed with a plurality of individual flow passages, the plurality of individual flow passages including a plurality of nozzles and a plurality of pressure chambers communicated with the plurality of nozzles respectively;

a plurality of actuators which are fixed to a surface of the flow passage substrate and which overlap with the plurality of pressure chambers respectively in an orthogonal direction orthogonal to the surface; and a protective substrate which is fixed to the surface and which covers the plurality of actuators, wherein the protective substrate has at least one wall portion for defining a plurality of actuator accommodating chambers which accommodate the plurality of actuators respectively, the wall portion overlaps in the orthogonal direction with a partition wall for partitioning two pressure chambers in the flow passage substrate, the wall portion being adhered to the surface via an adhesive portion composed of an adhesive, and a protective film, which has a moisture permeability lower than a moisture permeability of the adhesive, is formed at portions of the protective substrate and the adhesive portion which define the plurality of actuator accommodating chambers respectively.

According to a second aspect of the present teaching, there is provided a method for manufacturing a liquid discharge head, the method including:

an actuator forming step of forming a plurality of actuators on a surface of a flow passage substrate; and a protective substrate fixing step of fixing a protective substrate to the surface after the actuator forming step such that the plurality of actuators are covered with the protective substrate;

wherein the protective substrate has at least one wall portion for defining a plurality of actuator accommodating chambers each of which accommodates the actuator, the protective substrate is formed with a first communication hole for communicating at least one of the plurality of actuator accommodating chambers with outside and second communication holes for communicating the plurality of actuator accommodating chambers with each other, the protective substrate fixing step includes adhering the wall portion to the surface via an adhesive portion composed of an adhesive, such that the wall portion overlaps with a partition wall for partitioning two pressure chambers in the flow passage substrate in an orthogonal direction orthogonal to the surface, and the method further including:

a protective film forming step of forming a protective film which has a moisture permeability lower than a moisture permeability of the adhesive, at portions of the protective substrate and the adhesive portion which define the plurality of actuator accommodating chambers respectively, by injecting a gas from outside to inside of the protective substrate via the first communication hole, after the protective substrate fixing step; and a sealing step of sealing the first communication hole with a sealing member after the protective film forming step.

DETAILED DESCRIPTION

First Embodiment

Figure 1:
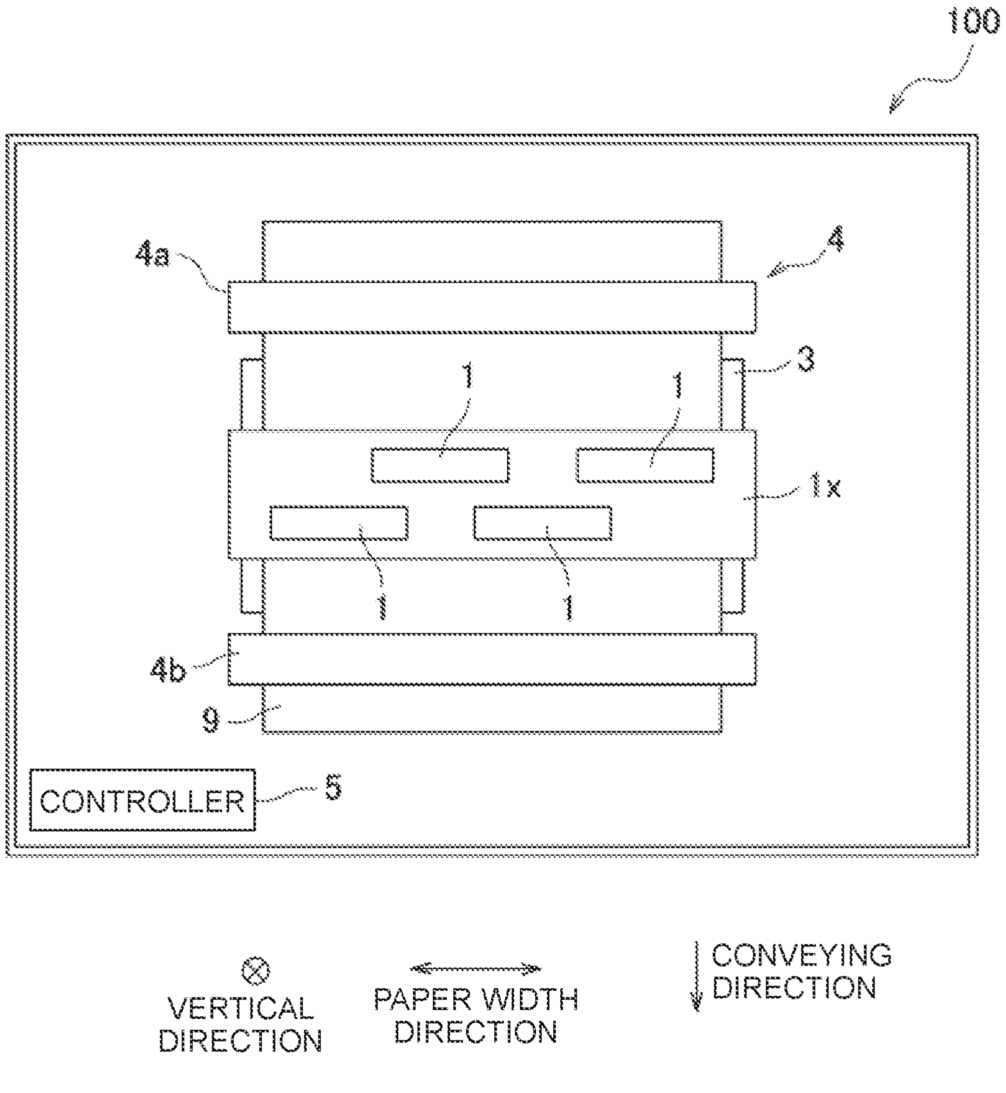
FIG. 1 is a plan view of a printer provided with heads according to a first embodiment of the present teaching.

As depicted in FIG. 1, heads 1 according to a first embodiment of the present teaching are provided for a printer 100. The printer 100 is provided with a head unit 1*x* including the four heads 1, a platen 3, a conveying mechanism 4, and a controller 5.

The head unit 1*x* is lengthy in the paper width direction (direction orthogonal to the vertical direction). The head unit 1*x* is based on the line type in which the ink is discharged from nozzles 22 (see FIGS. 2 and 3) to the recording paper 9 in a state in which the position is fixed. The four heads 1 are lengthy in the paper width direction respectively, and the four heads 1 are arranged in a zigzag form in the paper width direction.

The platen 3 is a flat plate member which is arranged under or below the head unit 1*x*. The recording paper 9 is placed on the upper surface of the platen 3.

The conveying mechanism 4 has two roller pairs 4*a*, 4*b* which are arranged while interposing the platen 3 in the conveying direction (direction orthogonal to the vertical direction and the paper width direction). When a conveyance motor (not depicted) is driven in accordance with the control of the controller 5, then the roller pairs 4*a*, 4*b* are rotated in a state in which the roller pairs 4*a*, 4*b* interpose the recording paper 9, and the recording paper 9 is conveyed in the conveying direction.

The controller 5 has ROM (Read Only Memory), RAM (Random Access Memory), and ASIC (Application Specific Integrated Circuit). ASIC executes, for example, the recording process in accordance with a program stored in ROM. In the recording process, the controller 5 controls the conveyance motor (not depicted) and driver ICs 19 of the respective heads 1 (see FIG. 3) on the basis of a recording command (including image data) inputted from an external apparatus such as PC or the like. Thus, the conveyance of the recording paper 9 is performed by the conveying mechanism 4, and the discharging action of the ink onto the recording paper is performed by the respective heads 1. An image is recorded on the recording paper 9.

Next, an explanation will be made about the configuration of the head 1.

Figure 2:
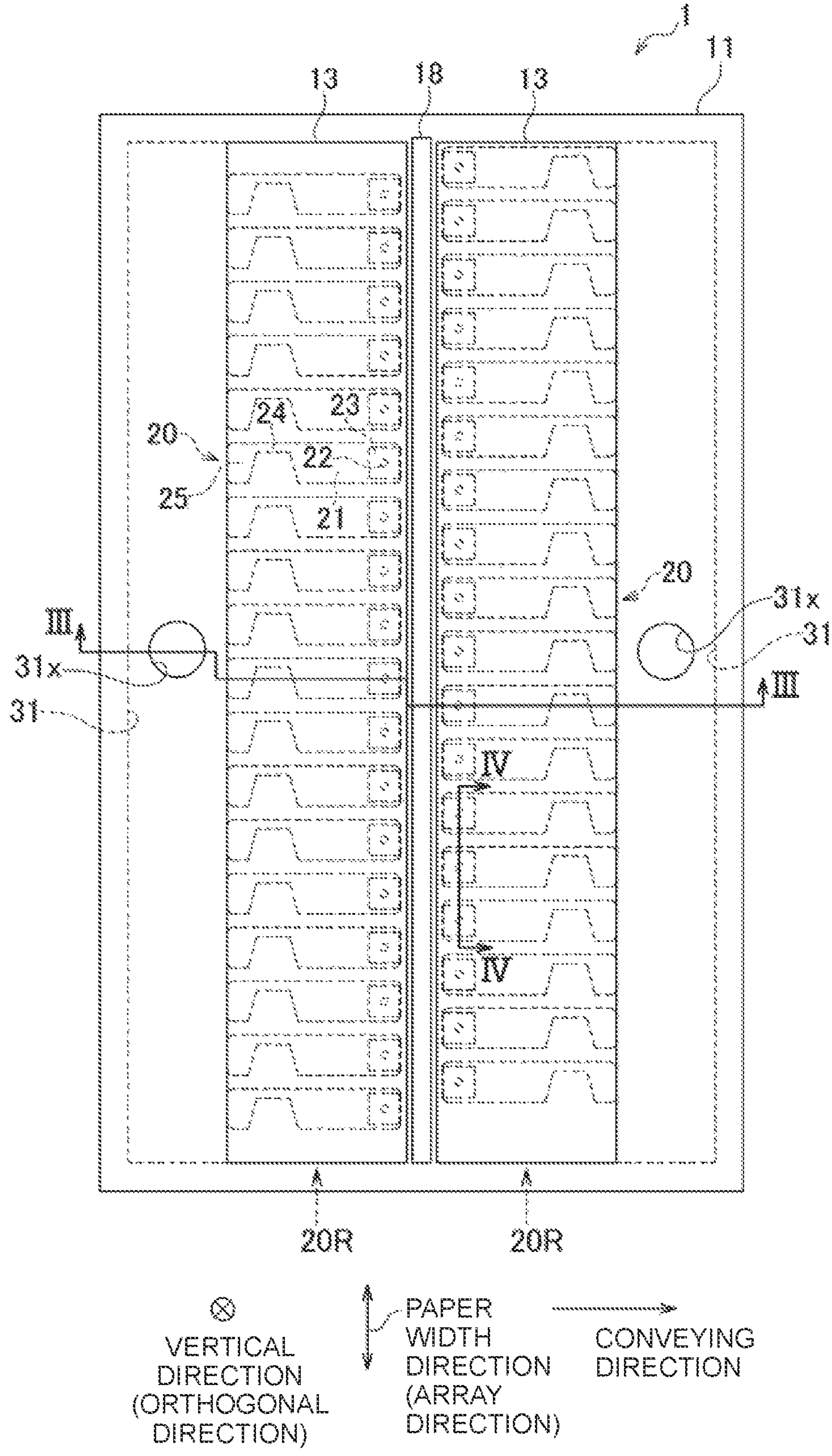
FIG. 2 is a plan view of the head.
Figure 3:
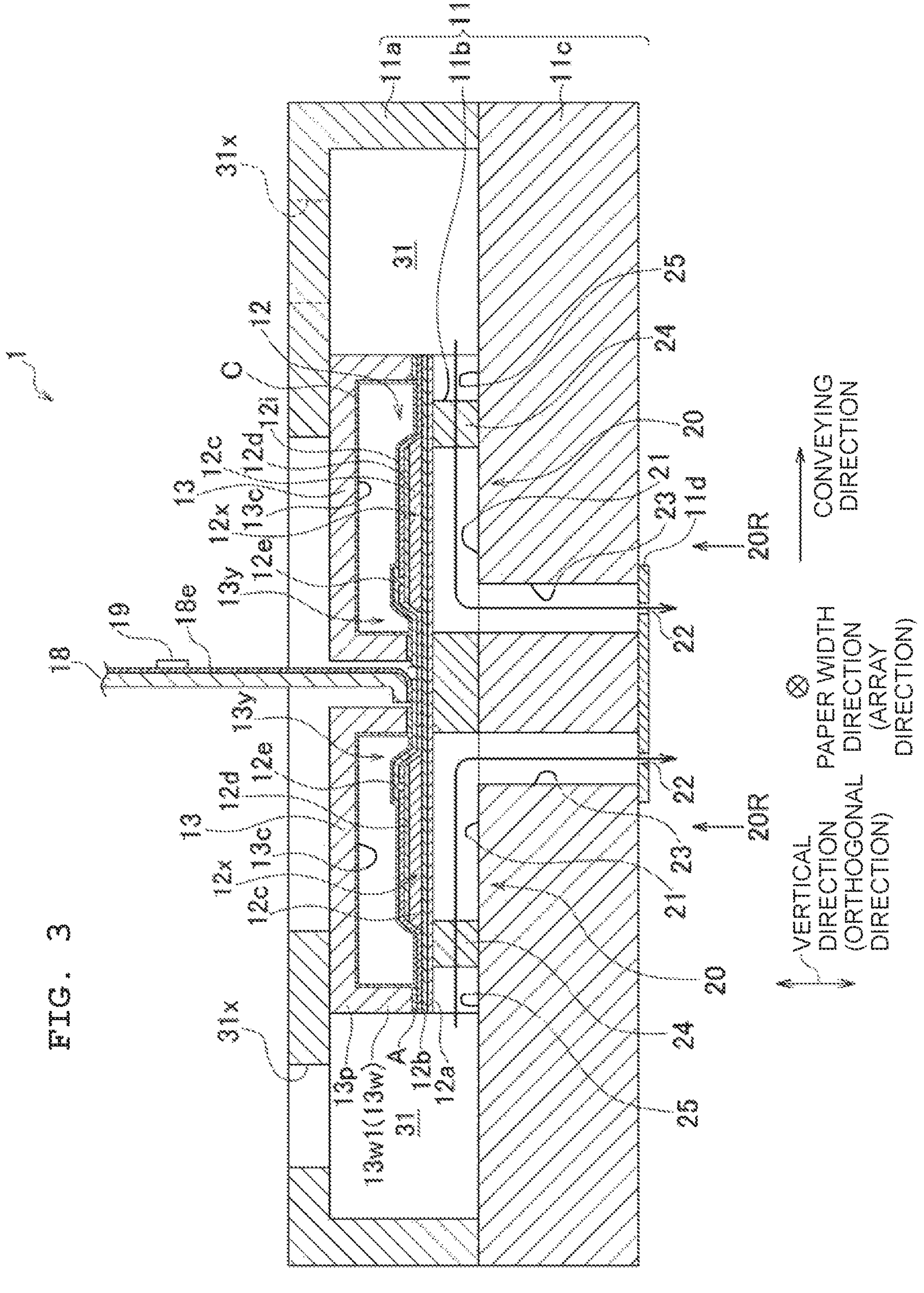
FIG. 3 is a sectional view of the head taken along a line III-III depicted in FIG. 2.

As depicted in FIGS. 2 and 3, the head 1 has a flow passage substrate 11, an actuator substrate 12, a wiring substrate 18, and two protective substrates 13.

The flow passage substrate 11 is composed of four plates 11*a* to 11*d* which are stacked in the vertical direction (orthogonal direction) and which are adhered to one another. The plate 11*a* disposed at the uppermost layer, which is included in the four plates 11*a* to 11*d*, is formed, for example, by the injection molding with resin, and the plate 11*a* is formed with two common flow passages 31. The plates 11*b* to 11*d* are composed of, for example, resin (for example, LCP: liquid crystal polymer) or metal (for example, SUS: stainless steel). The plates 11*b* to 11*d* are formed with a plurality of individual flow passages 20.

The plurality of individual flow passages 20 are arranged in the paper width direction (array direction) to constitute two individual flow passage arrays 20R. Each of the individual flow passage arrays 20R is composed of the plurality of individual flow passages 20 arranged in the paper width direction. The two individual flow passage arrays 20R are aligned in the conveying direction. The plurality of individual flow passages 20 are arranged in a zigzag form in the paper width direction as a whole.

As depicted in FIG. 2, the two common flow passages 31 extend in the paper width direction respectively, and the two common flow passages 31 are aligned in the conveying direction. The plurality of individual flow passages 20 are arranged between the two common flow passages 31 in the conveying direction. The two common flow passages 31 are communicated with a subtank (not depicted) via supply ports 31*x* respectively. The subtank is communicated with a main tank for storing the ink, and the subtank stores the ink supplied from the main tank. The ink contained in the subtank flows into the common flow passages 31 from the respective supply ports 31*x* by means of a pump (not depicted) which is driven in accordance with the control performed by the controller 5.

The common flow passage 31 disposed on the left side as viewed in FIG. 2, which is included in the two common flow passages 31, is communicated with the plurality of individual flow passages 20 belonging to the individual flow passage array 20R which is disposed on the left side as viewed in FIG. 2 and which is included in the two individual flow passage arrays 20R. The common flow passage 31 disposed on the right side as viewed in FIG. 2, which is included in the two common flow passages 31, is communicated with the plurality of individual flow passages 20 belonging to the individual flow passage array 20R which is disposed on the right side as viewed in FIG. 2 and which is included in the two individual flow passage arrays 20R.

As depicted in FIG. 2, each of the individual flow passages 20 includes a pressure chamber 21, a nozzle 22, a connecting flow passage 23, a narrow width flow passage 24, and a wide width flow passage 25.

The pressure chamber 21 has a substantially rectangular shape which is lengthy in the conveying direction on the plane orthogonal to the vertical direction. The connecting flow passage 23 is connected to one end in the conveying direction of the pressure chamber 21, and the narrow width flow passage 24 is connected to the other end in the conveying direction of the pressure chamber 21.

The narrow width flow passage 24 has a width which is smaller than the width (length in the paper width direction) of the pressure chamber 21, and the narrow width flow passage 24 functions as a throttle. The wide width flow passage 25 has a width which is approximately the same as the width (length in the paper width direction) of the pressure chamber 21.

As depicted in FIG. 3, the pressure chamber 21, the narrow width flow passage 24, and the wide width flow passage 25 are composed of through-holes formed through the plate 11*b*.

The connecting flow passage 23 is composed of a through-hole formed through the plate 11*c*, and the connecting flow passage 23 makes mutual communication between the pressure chamber 21 and the nozzle 22.

The nozzle 22 is composed of a through-hole formed through the plate 11*d*, and the nozzle 22 is open on the lower surface of the flow passage substrate 11.

As depicted in FIG. 2, the ink, which flows into the common flow passage 31 from each of the supply ports 31*x*, is supplied to the plurality of individual flow passages 20 belonging to the corresponding individual flow passage array 20R. In each of the individual flow passages 20, the ink, which is supplied from the common flow passage 31, flows into the wide width flow passage 25, and the ink passes through the narrow width flow passage 24 to flow into the pressure chamber 21. Then, the actuator 12*x* (see FIG. 3) is deformed as described later on, and the volume of the pressure chamber 21 is decreased. Accordingly, the pressure is applied to the ink contained in the pressure chamber 21, and the ink is discharged from the nozzle 22 after passing through the connecting flow passage 23. Further, in accordance with the discharging action of the ink from the nozzle 22, the ink is supplied from the common flow passage 31 to each of the individual flow passages 20, and the ink is supplied from the subtank to the common flow passage 31.

As depicted in FIG. 3, the actuator substrate 12 is fixed to the upper surface of the plate 11*b*. The actuator substrate 12 includes a vibration plate 12*a*, a common electrode 12*b*, a plurality of piezoelectric members 12*c*, and a plurality of individual electrodes 12*d* as referred to in this order starting from the bottom.

The vibration plate 12*a* and the common electrode 12*b* are arranged over the entire region of the upper surface of the plate 11*b*, and the vibration plate 12*a* and the common electrode 12*b* cover all of the pressure chambers 21 formed in the plate 11*b*. On the other hand, the piezoelectric member 12*c* and the individual electrode 12*d* are provided for each of the pressure chambers 21, and the piezoelectric member 12*c* and the individual electrode 12*d* are overlapped in the vertical direction with the pressure chamber 21.

The actuator substrate 12 further includes an insulating film 12*i* and a plurality of wirings 12*e*.

The insulating film 12*i* is composed of, for example, silicon dioxide ($SiO_2$), and the insulating film 12*i* covers the portion of the upper surface of the common electrode 12*b* on which the piezoelectric member 12*c* is not provided, the side surface of the piezoelectric member 12*c*, and the upper surface of the individual electrode 12*d*. A through-hole is provided at a portion of the insulating film 12*i* overlapped in the vertical direction with the individual electrode 12*d*.

The wiring 12*e* is provided for each of the individual electrodes 12*d*. The forward end of the wiring 12*e* enters the foregoing through-hole of the insulating film 12*i*, and thus the wiring 12*e* is electrically connected to the individual electrode 12*d*.

The wiring substrate 18 is composed of, for example, COF (Chip On Film), and one end of the wiring substrate 18 is fixed to the center in the conveying direction of the upper surface of the actuator substrate 12. The wiring substrate 18 has a plurality of individual wirings 18*e* which are electrically connected to the plurality of wirings 12*e* respectively and a common wiring (not depicted) which is electrically connected to the common electrode 12*b*.

The other end of the wiring substrate 18 is connected to the controller 5 (see FIG. 1). Driver IC 19 is mounted between one end and the other end of the wiring substrate 18.

The driver IC 19 is electrically connected to the individual electrode 12*d* via the individual wiring 18*e*, and the driver IC 19 is electrically connected to the common electrode 12*b* via the common wiring. The driver IC 19 maintains the electric potential of the common electrode 12*b* at the ground electric potential. On the other hand, the driver IC 19 generates the driving signal on the basis of the control signal fed from the controller 5, and the driving signal is applied to the individual electrode 12*d*. Accordingly, the electric potential of the individual electrode 12*d* is changed between the predetermined driving electric potential and the ground electric potential. In this situation, the portion (actuator 12*x*) of the piezoelectric member 12*c*, which is interposed by the individual electrode 12*d* and the common electrode 12*b*, is shrunk in the in-plane direction in accordance with the piezoelectric transverse effect. In accordance therewith, the portion of the actuator substrate 12, which is overlapped in the vertical direction with the pressure chamber 21, is deformed so that the portion protrudes toward the pressure chamber 21. Accordingly, the volume of the pressure chamber 21 is decreased, and the pressure is applied to the ink contained in the pressure chamber 21.

As depicted in FIG. 3, the two protective substrates 13 are fixed to the upper surface of the actuator substrate 12. The protective substrate 13 is provided for each of the individual flow passage arrays 20R, and the protective substrate 13 covers the plurality of actuators 12*x* corresponding to the concerning individual flow passage array 20R.

Each of the protective substrates 13 has a wall portion 13*w* and a plate portion 13*p*.

The wall portion 13*w* corresponds to the side wall of the protective substrate 13. The lower end of the wall portion 13*w* is adhered to the upper surface of the actuator substrate 12 via an adhesive portion A composed of an adhesive (for example, adhesive based on epoxy or based on silicone).

The plate portion 13*p* corresponds to the upper wall of the protective substrate 13, and the plate portion 13*p* is connected to the upper end of the wall portion 13*w*. The plate portion 13*p* defines the outer shape of the protective substrate 13 depicted in FIG. 5. The plate portion 13*p* has a rectangular shape which is lengthy in the paper width direction on the plane orthogonal to the vertical direction. The plate portion 13*p* is overlapped in the vertical direction with the plurality of actuators 12*x* corresponding to the concerning individual flow passage array 20R.

Figure 4:
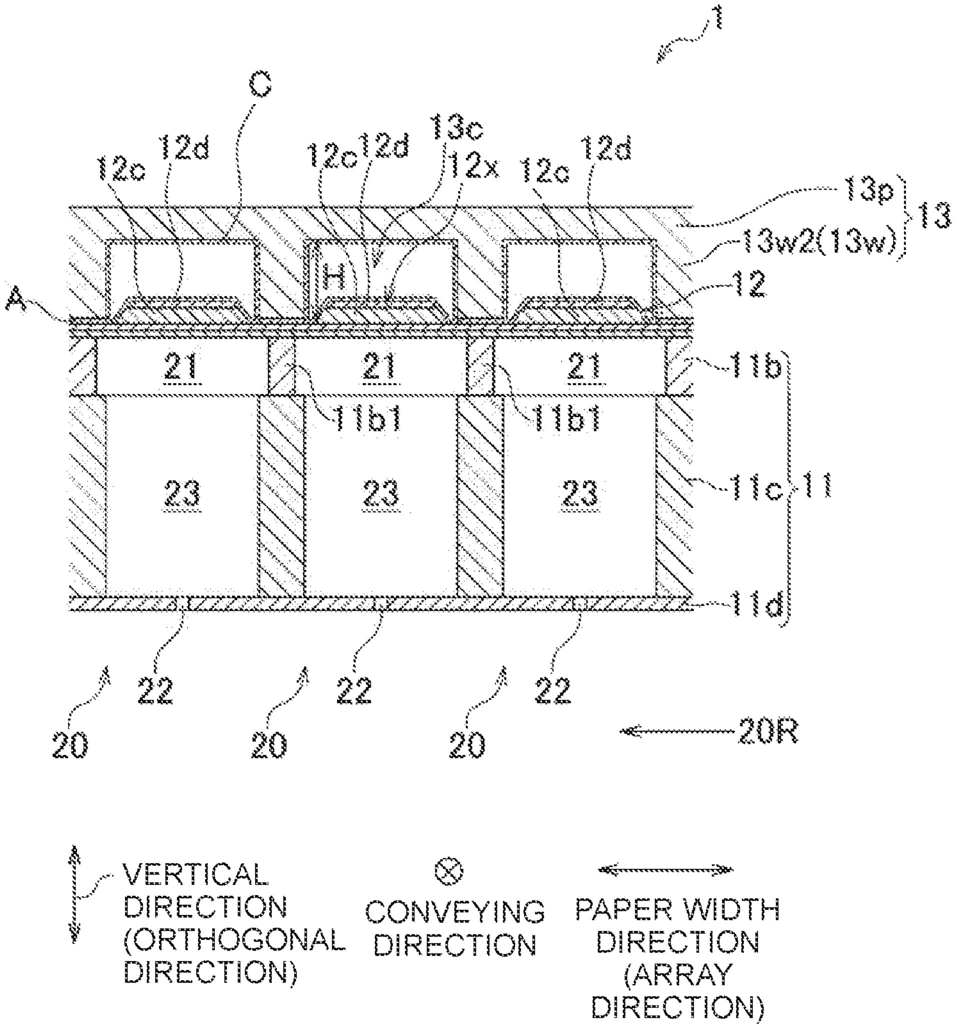
FIG. 4 is a sectional view of the head taken along a line IV-IV depicted in FIG. 2.
Figure 5:
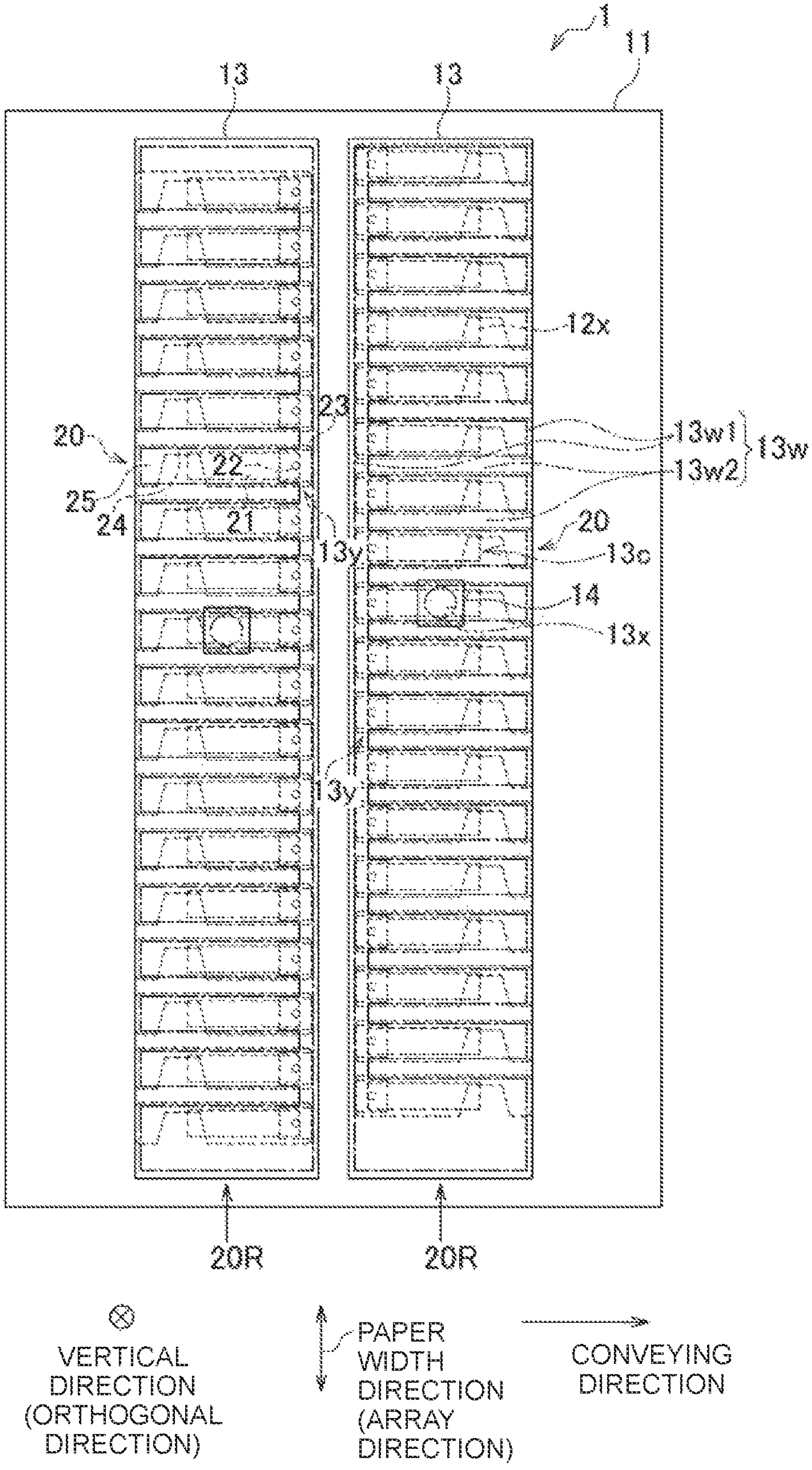
FIG. 5 is a plan view corresponding to FIG. 2 illustrative of a relationship of a protective substrate with respect to actuators and individual flow passages.
Figure 6:
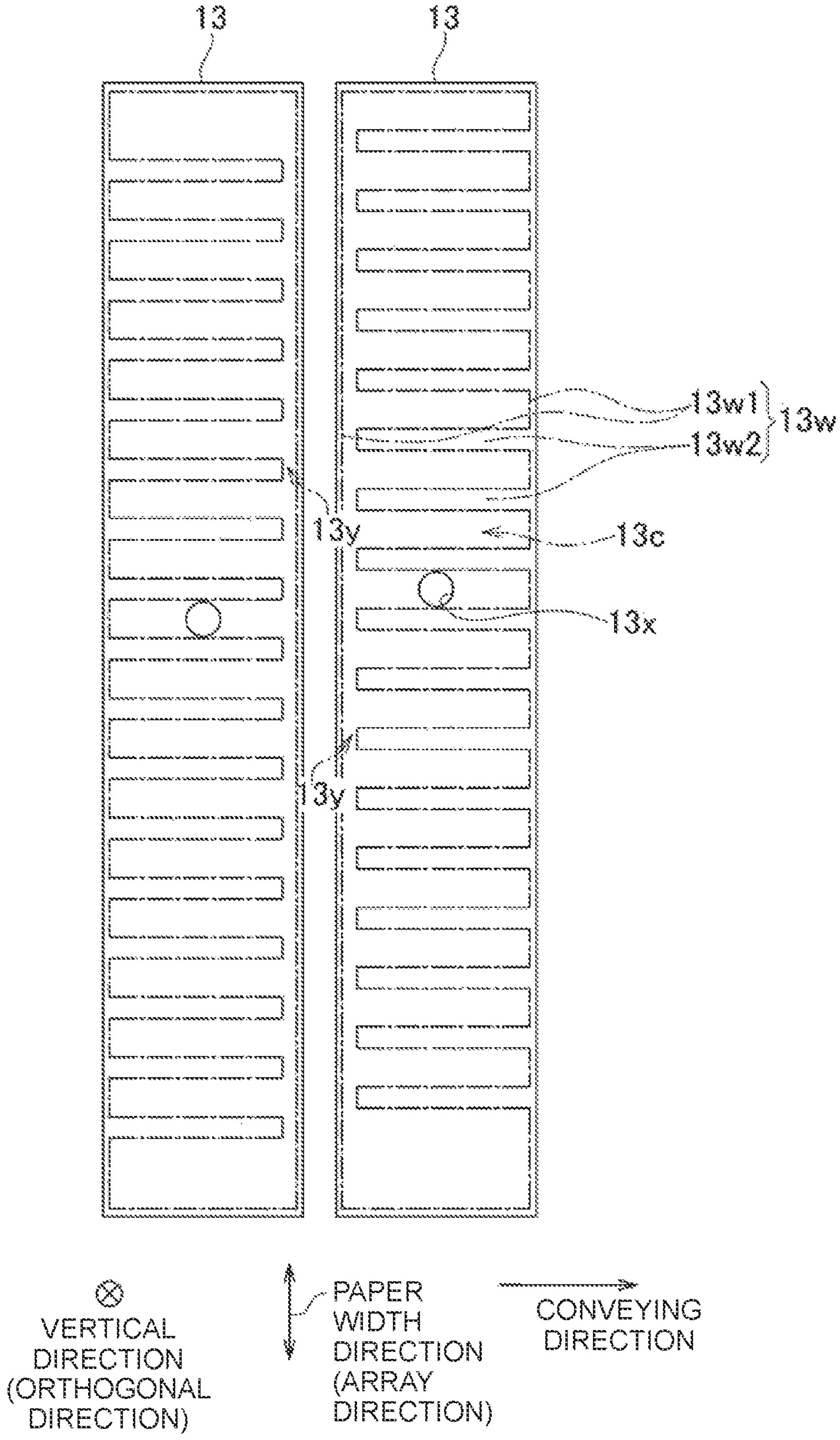
FIG. 6 is a plan view corresponding to FIG. 5 illustrative of the protective substrate.

As depicted in FIGS. 5 and 6, the wall portion 13*w* includes a pair of first wall portions 13*w*1 which extend in the paper width direction respectively, and a plurality of second wall portions 13*w*2 which extend in the conveying direction respectively. As depicted in FIG. 4, each of the second wall portions 13*w*2 is overlapped in the vertical direction with a partition wall 11*b*1 which partitions the two pressure chambers 21 in the plate 11*b*.

Owing to the configuration of the wall portion 13*w* as described above, a plurality of actuator accommodating chambers 13*c* are defined. Each of the actuator accommodating chambers 13*c* accommodates one actuator 12*x*. As depicted in FIG. 5, the plurality of actuator accommodating chambers 13*c* are arranged in the paper width direction. Further, the height H (length in the vertical direction) of each of the actuator accommodating chambers 13*c* is not less than 100 μm (see FIG. 4).

As depicted in FIGS. 5 and 6, a first communication hole 13*x* is formed at the center in the conveying direction and the paper width direction of the plate portion 13*p*. The first communication hole 13*x* penetrates through the plate portion 13*p* in the vertical direction. The first communication hole 13*x* makes communication between the outside and one of the plurality of actuator accommodating chambers 13*c* defined by the protective substrate 13. As depicted in FIG. 5, the first communication hole 13*x* is sealed by a plate-shaped sealing member 14.

Each of the second wall portions 13*w*2 extends in the conveying direction from one of the pair of first wall portions 13w1 (first wall portion 13w1 overlapped in the vertical direction with the wide width flow passage 25 as depicted in FIG. 5). The forward end of each of the second wall portions 13w2 is not connected to the other of the pair of first wall portions 13w1. The spaces, which are provided between the forward ends of the respective second wall portions 13w2 and the other of the pair of first wall portions 13w1, constitute second communication holes 13y which make mutual communication among the plurality of actuator accommodating chambers 13c. The second communication hole 13y is formed over the entire length in the vertical direction of the actuator accommodating chamber 13c as depicted in FIG. 3 at the position at which the second communication hole 13y is not overlapped in the paper width direction with the actuator 12x as depicted in FIG. 5.

In relation to the protective substrate 13 configured as described above, a protective film (protective coating) C is formed on the entire inner wall surface of the protective substrate 13 (see FIGS. 3 and 4). The protective film C is composed of a material (for example, at least any one of tantalum oxide, hafnium oxide, and aluminum oxide) having a moisture permeability lower than a moisture permeability of the adhesive for constructing the adhesive portion A. The protective film C is formed at portions of the protective substrate 13 and the adhesive portion A for defining the respective actuator accommodating chambers 13c. Further, the protective film C is also formed on the upper surface of the individual electrode 12d and the side surface of the piezoelectric member 12c for constructing each of the actuators 12x.

Figure 7:
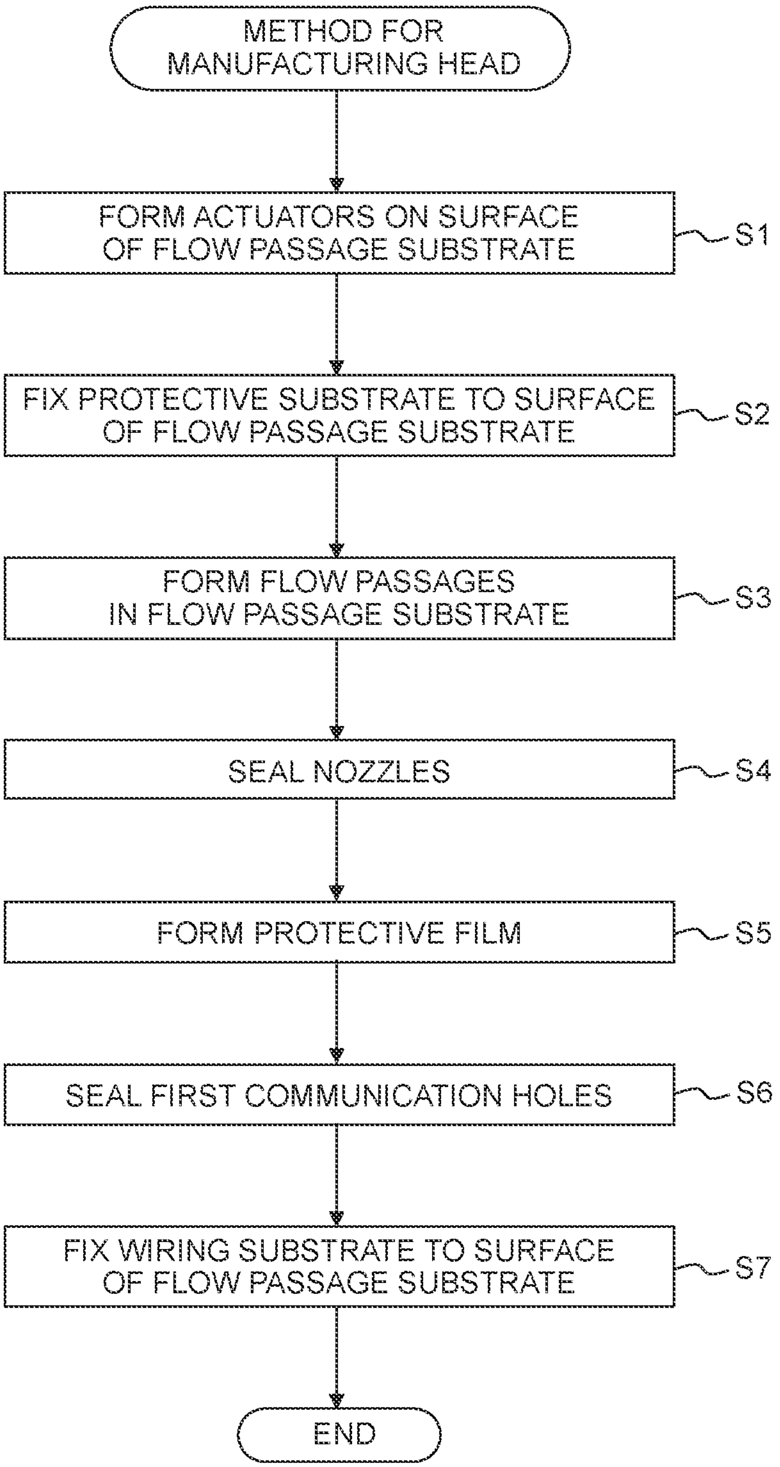
FIG. 7 is a flow chart illustrative of a method for manufacturing the head.

Next, an explanation will be made about a method for manufacturing the head 1 with reference to FIG. 7.

At first, the actuators 12x are formed on the surface of a silicon single crystal substrate which serves as the plate 11b (S1: actuator forming step). Specifically, the vibration plate 12a, which is composed of a film of silicon dioxide, is formed, for example, by the thermal oxidation on the surface of the silicon single crystal substrate which serves as the plate 11b. After that, the common electrode 12b is formed on the surface of the vibration plate 12a, the plurality of piezoelectric members 12c are formed on the surface of the common electrode 12b, and the individual electrodes 12d are formed on the surfaces of the respective piezoelectric members 12c. Further, the insulating film 12i and the plurality of wirings 12e are thereafter formed, for example, by means of the sputtering and the etching.

After S1, the two protective substrates 13 are fixed to the surface of the silicon single crystal substrate which serves as the plate 11b so that the plurality of actuators 12x corresponding to the individual flow passage arrays 20R respectively are covered therewith (S2: protective substrate fixing step). Specifically, the lower end of the wall portion 13w is adhered to the surface of the silicon single crystal substrate which serves as the plate 11b via the adhesive portion A composed of the adhesive. The plate portion 13p is arranged so that the plurality of actuators 12x are covered therewith.

After S2, the flow passages (common flow passage 31 and individual flow passages 20) are formed on the flow passage substrate 11 (S3). Specifically, the silicon single crystal substrate, which serves as the plate 11b, is polished until a predetermined thickness is obtained. After that, the etching is applied to the lower surface of the silicon single crystal substrate to form the pressure chamber 21, the narrow width flow passage 24, and the wide width flow passage 25 of each of the individual flow passages 20. At this stage, the silicon single crystal substrate is designated as the plate 11b. After that, the plate 11c is adhered to the lower surface of the plate 11b, the plate 11d is adhered to the lower surface of the plate 11c, and the plate 11a is adhered to the upper surface of the plate 11c. Thus, the flow passage substrate 11, on which the common flow passage 31 and the individual flow passages 20 are formed, is completed. In this procedure, the wall portion 13w is arranged so that the wall portion 13w is overlapped with the partition wall 11b1 in the direction orthogonal to the surface of the flow passage substrate 11 (see FIG. 4).

After S3, the nozzles 22, which are formed on the lower surface of the flow passage substrate 11, are sealed with a sealing member (another member distinct from the sealing member 14) (S4).

After S4, the protective film C is formed on the entire inner wall surface of the protective substrate 13 (S5: protective film forming step). Specifically, the member, which includes the flow passage substrate 11, the actuator substrate 12, and the protective substrate 13 formed in S1 to S4, is arranged in a gas chamber, and the gas is injected into the gas chamber by using the atomic layer stacking method. Accordingly, the gas is injected into the interior from the outside of the protective substrate 13 via the first communication hole 13x. Then, the gas spreads throughout the plurality of actuator accommodating chambers 13c via the second communication holes 13y. Thus, the protective film C is formed at the portions of the protective substrate 13 and the adhesive portion A which define the respective actuator accommodating chambers 13c, as well as the upper surfaces of the individual electrodes 12d and the side surfaces of the piezoelectric members 12c which constitute the respective actuators 12x. In this procedure, the nozzles 22 are sealed with the sealing member, and hence the protective film C is not formed on the nozzles 22.

After S5, the first communication hole 13x is sealed with the sealing member 14 (S6: sealing step). Accordingly, the communication is blocked between the actuator accommodating chamber 13c and the outside.

After S6, one end of the wiring substrate 18 is fixed to the surface of the flow passage substrate 11 (S7). Specifically, one end of the wiring substrate 18 is arranged on the surface of the flow passage substrate 11 with a thermosetting adhesive intervening therebetween, and the adhesive is cured by being heated and pressurized. Accordingly, the individual wiring 18e and the wiring 12e are electrically connected to one another, and the common wiring (not depicted) and the common electrode 12b are electrically connected to one another. Thus, the head 1 is completed.

As described above, according to this embodiment, as depicted in FIG. 4, the wall portions 13w of the protective substrate 13 are overlapped in the vertical direction with the partition walls 11b1 of the flow passage substrate 11, and thus it is possible to suppress the structural crosstalk (phenomenon in which the vibration caused by the deformation of a certain actuator 12x is transmitted to another actuator 12x adjacent to the concerning actuator 12x). Further, as depicted in FIGS. 3 and 4, the protective film C is formed at the portions of the protective substrate 13 and the adhesive portion A for defining the respective actuator accommodating chambers 13c. Thus, it is possible to suppress the invasion of moisture into the actuator accommodating chamber 13c from the outside via the adhesive portion A (consequently, it is possible to suppress the destruction of the actuator 12x).

As depicted in FIGS. 5 and 6, the protective substrate 13 is formed with the first communication hole 13x which makes communication between the actuator accommodating chamber 13c and the outside and the second communication holes 13*y* which make mutual communication among the plurality of actuator accommodating chambers 13*c*. In this arrangement, even in the case of the configuration in which the plurality of actuator accommodating chambers 12*c* are defined in the protective substrate 13, the gas can be allowed to spread throughout the plurality of actuator accommodating chambers 13*c* via the first communication hole 13*x* and the second communication holes 13*y* in S5 (protective film forming step), and it is possible to efficiently form the protective film C. Further, after S5 (protective film forming step), the first communication hole 13*x* is sealed with the sealing member 14 (S6). Accordingly, it is possible to suppress the invasion of moisture into the actuator accommodating chamber 13*c* from the outside via the first communication hole 13*x* (consequently, it is possible to suppress the destruction of the actuator 12*x*).

The second communication hole 13*y* is formed over the entire length in the vertical direction of the actuator accommodating chamber 13*c* as depicted in FIG. 3, at the position at which the second communication hole 13*y* is not overlapped in the paper width direction with the actuator 12*x* as depicted in FIG. 5. If the second communication hole 13*y* is formed over the entire length in the vertical direction of the actuator accommodating chamber 13*c* as depicted in FIG. 3, at any position at which the second communication hole 13*y* is overlapped in the paper width direction with the actuator 12*x*, then the binding force, which is exerted on the partition wall 11*b*1 by the wall portion 13*w*, may be reduced, and the effect to suppress the structural crosstalk may be reduced. On the contrary, in the configuration of the present teaching, the second communication hole 13*y* is not overlapped in the paper width direction with the actuator 12*x*. Therefore, the binding force, which is exerted on the partition wall 11*b*1 by the wall portion 13*w*, is not reduced. It is possible to maintain the effect to suppress the structural crosstalk. Further, the second communication hole 13*y* is formed over the entire length in the vertical direction of the actuator accommodating chamber 13*c*. Therefore, the gas easily spreads throughout the plurality of actuator accommodating chambers 13*c* via the second communication holes 13*y*. It is possible to reliably form the protective film C with respect to all of the actuator accommodating chambers 13*c*.

The atomic layer stacking method is used in S5 (protective film forming step). In this procedure, it is possible to easily form the protective film C.

The protective film C is composed of at least any one of tantalum oxide, hafnium oxide, and aluminum oxide. In this case, it is possible to effectively realize the atomic layer stacking method by using the material suitable for the atomic layer stacking method (consequently, it is possible to easily form the protective film C).

The height (length in the vertical direction) H of the actuator accommodating chamber 13*c* is not less than 100 μm (see FIG. 4). If the height of the actuator accommodating chamber 13*c* is less than 100 μm, then the air resistance to enter the actuator accommodating chamber 13*c* is raised for the gas injected by the atomic layer stacking method or the like, and it is impossible to allow the gas to sufficiently spread throughout the actuator accommodating chamber 13*c* in S5 (protective film forming step (consequently, it may be difficult to form the protective film C on the entire actuator accommodating chamber 13*c*). On the contrary, in the configuration of the present teaching, the height of the actuator accommodating chamber 13*c* is not less than 100 μm. Therefore, the air resistance to enter the actuator accommodating chamber 13*c* is low for the gas injected by the atomic layer stacking method or the like. It is possible to allow the gas to sufficiently spread throughout the actuator accommodating chamber 13*c* in S5 (protective film forming step (consequently, it is possible to form the protective film C on the entire actuator accommodating chamber 13*c*).

The protective film C is also formed on the surface of the actuator 12*x* (on the upper surface of the individual electrode 12*d* and the side surface of the piezoelectric member 12*c*) (see FIGS. 3 and 4). In this case, even if any moisture enters the actuator accommodating chamber 13*c* from the outside, it is possible to suppress the destruction of the actuator 12*x*. Note that the protective film C is thin, and hence the deformation of the actuator 12*x* is not inhibited by the protective film C.

In S5 (protective film forming step), the nozzle 22 is sealed with the sealing member (member distinct from the sealing member 14) upon the injection of the gas (see S4). If the protective film C is formed on the nozzle 22, any malfunction may occur in the discharging action of the ink. In the configuration of the present teaching, the nozzle 22 is sealed upon the injection of the gas. Thus, it is possible to suppress the formation of the protective film C on the nozzle 22 (consequently, it is possible to suppress the occurrence of the malfunction in the discharging action of the ink).

Second Embodiment

Figure 8:
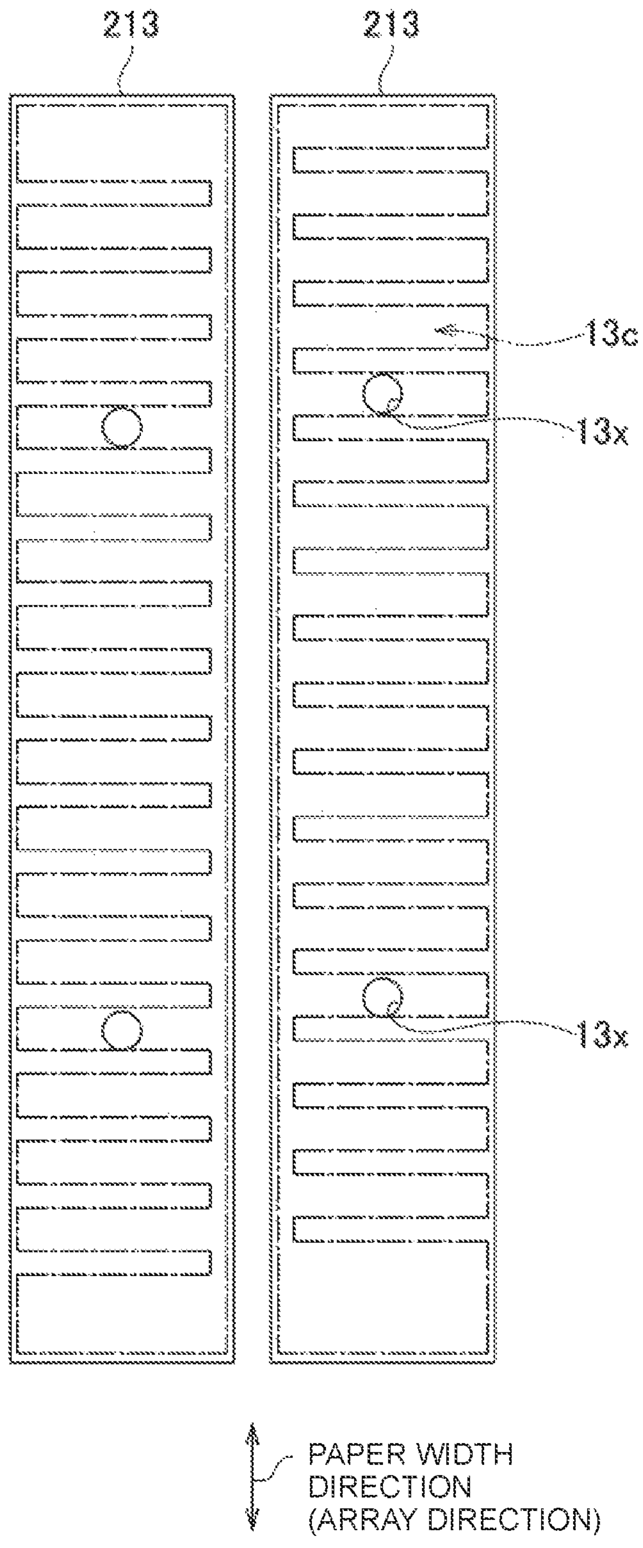
FIG. 8 is a plan view corresponding to FIG. 6 illustrative of a protective substrate of a head according to a second embodiment of the present teaching.

Next, a second embodiment of the present teaching will be explained with reference to FIG. 8.

In the first embodiment (FIG. 6), one first communication hole 13*x* is formed for one protective substrate 13. However, in the second embodiment (FIG. 8), two first communication holes 13*x* are formed for one protective substrate 213. The two first communication holes 13*x* are separated from each other in the paper width direction (array direction).

According to this embodiment, it is possible to allow the gas to sufficiently spread throughout the actuator accommodating chamber 13*c* arranged at the end portion in the paper width direction in S5 (protective film forming step) as well (consequently, it is possible to reliably form the protective film C on all of the actuator accommodating chambers 13*c*).

Third Embodiment

Figure 9:
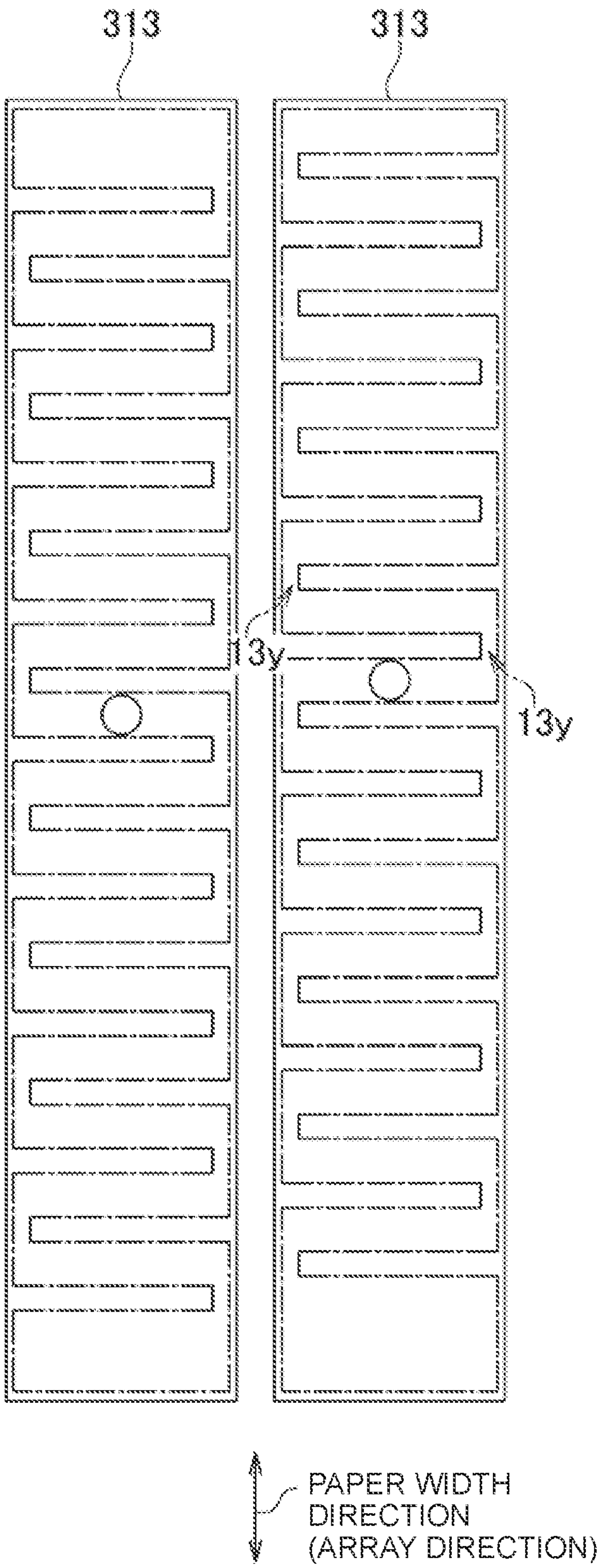
FIG. 9 is a plan view corresponding to FIG. 6 illustrative of a protective substrate of a head according to a third embodiment of the present teaching.

Next, a third embodiment of the present teaching will be explained with reference to FIG. 9.

In the first embodiment (FIG. 6), the second communication holes 13*y* are arranged in one array in each of the protective substrates 13. However, in the third embodiment (FIG. 9), second communication holes 13*y* are arranged in a zigzag form in the paper width direction (array direction) in each of protective substrates 313. The two second communication holes 13*y*, which are adjacent to one another in the paper width direction, are not overlapped with each other in the paper width direction.

When the two second communication holes 13*y*, which are adjacent to one another in the paper width direction, are overlapped with each other in the paper width direction (see FIG. 6), then the strength of the protective substrate 13 may be locally lowered at the portion at which the second communication hole 13*y* is formed, and the protective substrate 13 may be damaged or fractured in S2 (protective substrate fixing step). On the contrary, in this embodiment, the two second communication holes 13*y*, which are adjacent to one another in the paper width direction, are not overlapped with each other in the paper width direction. Therefore, the local decrease in the strength of the protective substrate 313 is suppressed, and the protective substrate 313 is hardly damaged or fractured in S2 (protective substrate fixing step).

Further, according to this embodiment, the second communication holes 13*y* are arranged in the zigzag form in the paper width direction, and thus the decrease in the strength of the protective substrate 313 is more suppressed. The protective substrate 313 is more hardly damaged or fractured in S2 (protective substrate fixing step).

Fourth Embodiment

Next, a fourth embodiment of the present teaching will be explained with reference to FIG. 10.

In the first embodiment, as depicted in FIG. 6, the second wall portion 13*w*2 extends from one of the pair of first wall portions 13*w*1, and the forward end of the second wall portion 13*w*2 is not connected to the other of the pair of first wall portions 13*w*1. Further, the second communication hole 13*y* is constructed by the space provided between the forward end of the second wall portion 13*w*2 and the other of the pair of first wall portions 13*w*1. Further, as depicted in FIG. 3, the second communication hole 13*y* is formed over the entire length in the vertical direction of the actuator accommodating chamber 13*c*.

Figure 10:
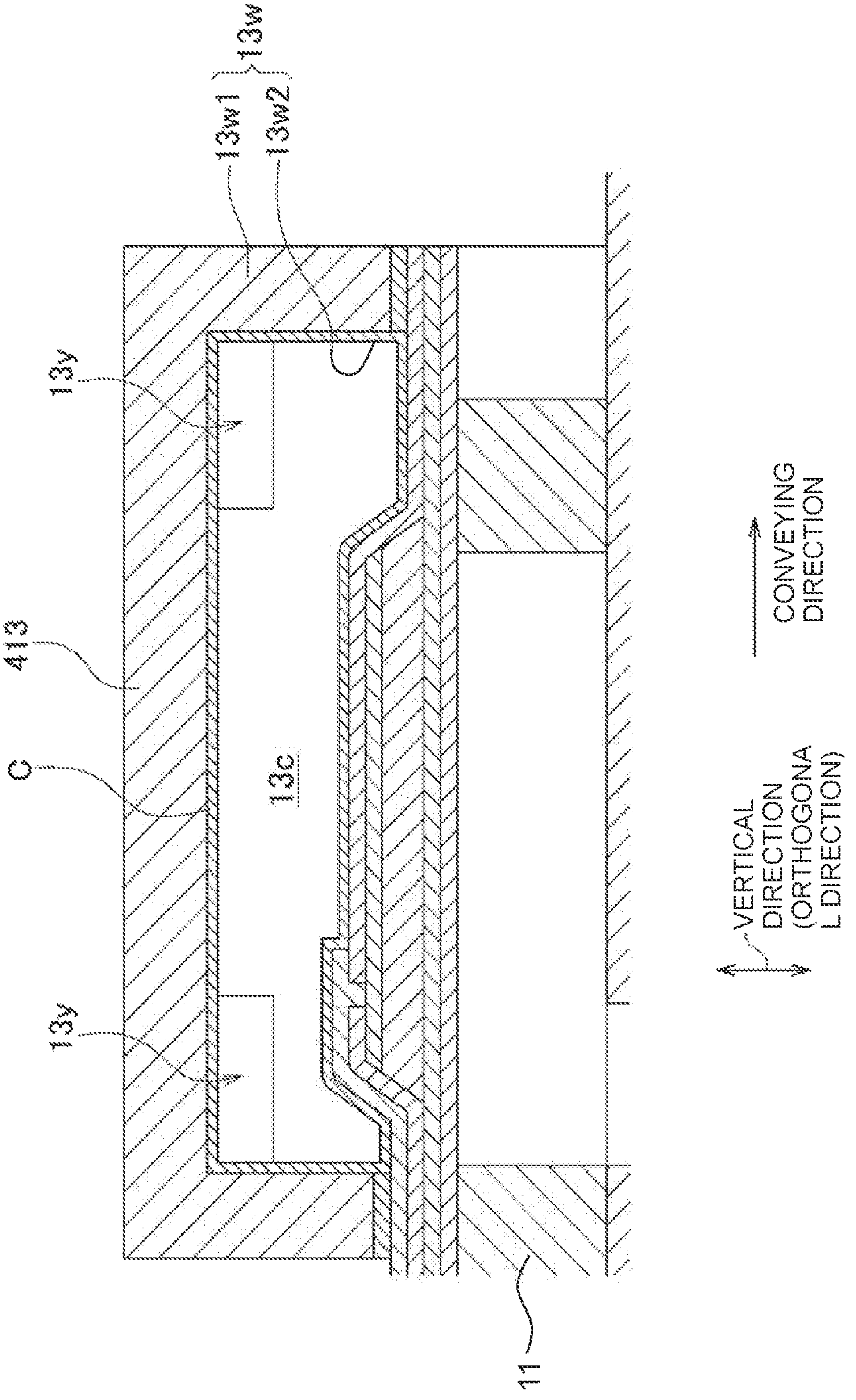
FIG. 10 is a sectional view corresponding to a partial enlarged view of FIG. 3 illustrative of a protective substrate of a head according to a fourth embodiment of the present teaching.

On the contrary, in the fourth embodiment, as depicted in FIG. 10, a second wall portion 13*w*2 is connected to both of the pair of first wall portions 13*w*1, and second communication holes 13*y* are constructed by through-holes formed at the upper end of the second wall portion 13*w*2 (the other end disposed on the side opposite to one end adhered to the upper surface of the flow passage substrate 11). The second communication holes 13*y* are formed at only upper positions in the vertical direction of the actuator accommodating chamber 13*c*. Further, in the fourth embodiment, the second communication holes 13*y* are provided respectively at one end and the other end in the conveying direction of the second wall portion 13*w*2.

When the second communication hole 13*y* is formed at the portion including the lower end of the wall portion 13*w*, then the binding force, which is exerted on the partition wall 11*b*1 (see FIG. 4) by the wall portion 13*w*, may be reduced, and the effect to suppress the structural crosstalk may be reduced. On the contrary, in this embodiment, the second communication hole 13*y* is formed at the portion except for the lower end of the wall portion 13*w*. Therefore, the binding force, which is exerted on the partition wall 11*b*1 by the wall portion 13*w*, is not reduced, and it is possible to maintain the effect to suppress the structural crosstalk. In other words, it is possible to make communication among the plurality of actuator accommodating chambers 13*c* by means of the second communication holes 13*y* (consequently, it is possible to efficiently form the protective film C on the entire inner wall surface of the protective substrate 413 in S5 (protective film forming step)), while maintaining the effect to suppress the structural crosstalk.

Fifth Embodiment

Figure 11:
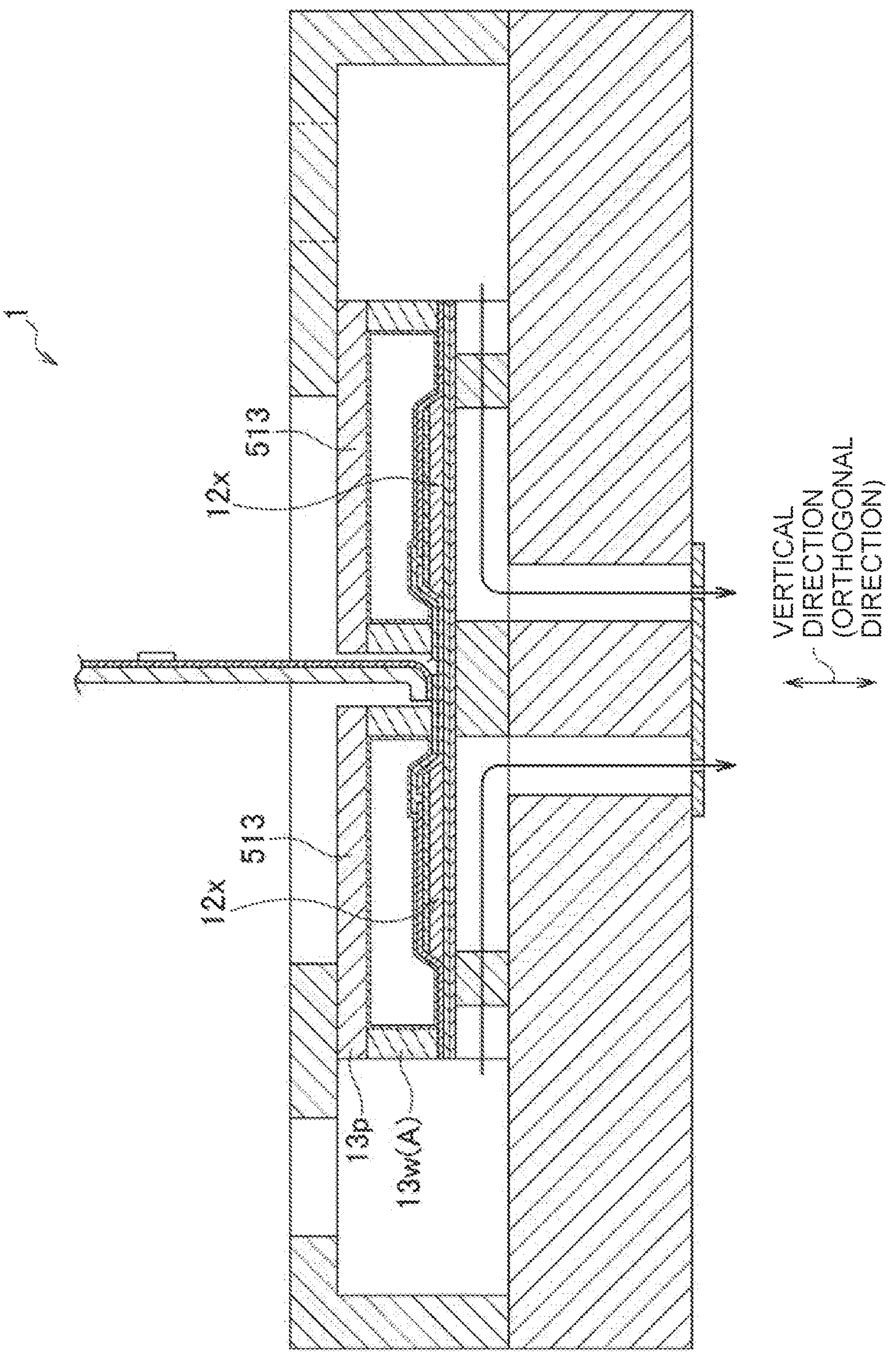
FIG. 11 is a sectional view corresponding to FIG. 3 illustrative of a protective substrate of a head according to a fifth embodiment of the present teaching.

Next, a fifth embodiment of the present teaching will be explained with reference to FIG. 11.

In the first embodiment (FIG. 3), the wall portions 13*w* and the plate portion 13*p* of the protective substrate 13 are composed of one member. However, in the fifth embodiment (FIG. 11), wall portions 13*w* and a plate portion 13*p* of a protective substrate 513 are composed of distinct members.

In this embodiment, the wall portion 13*w* is composed of a photosensitive adhesive for constructing the adhesive portion A. The plate portion 13*p* is composed of a plate-shaped member which is distinct from the wall portion 13*w*. The plate portion 13*p* is connected to the upper ends of the wall portions 13*w*, and the plate portion 13*p* is overlapped in the vertical direction (orthogonal direction) with the plurality of actuators 12*x*.

Further, in this embodiment, in S2 (protective substrate fixing step), the wall portions 13*w*, which are composed of the photosensitive adhesive, are firstly formed on the surface of a silicon single crystal substrate which serves as the plate 11*b* by using a photomask. After that, the plate portion 13*p* is arranged so that the plurality of actuators 12*x* are covered therewith, and the plate portion 13*p* is fixed to the upper ends of the wall portions 13*w*.

According to this embodiment, the wall portion 13*w* is composed of the photosensitive adhesive, and thus it is possible to perform the patterning having the satisfactory position accuracy based on the use of the photomask upon the formation of the wall portion 13*w*.

Further, the wall portion 13*w* can be formed at the satisfactory position accuracy, and hence any high position accuracy is not required for the plate portion 13*p*. Therefore, it is possible to form the protective substrate 513 including the wall portions 13*w* and the plate portion 13*p* easily and highly accurately.

Modified Embodiments

The embodiments of the present teaching have been explained above. However, the present teaching is not limited to the embodiments described above, for which it is possible to make various design changes within a scope as defined in claims.

In the fourth embodiment (FIG. 10), the second communication holes 13*y* are formed at the upper end of the second wall portion 13*w*2. However, when the second communication hole 13*y* is formed at any portion except for the lower end of the second wall portion 13*w*2 (for example, even when the second communication hole 13*y* is formed at an intermediate portion between the upper end and the lower end of the second wall portion 13*w*2), then the binding force, which is exerted on the partition wall 11*b*1 by the wall portion 13*w*, is not reduced, and it is possible to maintain the effect to suppress the structural crosstalk.

Further, when the second communication hole 13*y* is formed at the portion except for the lower end of the second wall portion 13*w*2 as in the fourth embodiment (FIG. 10), the binding force, which is exerted on the partition wall 11*b*1 by the wall portion 13*w*, is hardly reduced, even if the second communication hole 13*y* is overlapped in the paper width direction with the actuator 12*x*.

In the embodiments described above (FIGS. 6 and 9), the first communication hole 13*x* is formed through the top surface of the protective substrate. However, the first communication hole 13*x* may be formed through the side surface of the protective substrate (wall portion 13*w* for constructing the outer surface of the protective substrate).

In the embodiment described above (FIG. 7), the flow passages are formed in the flow passage substrate (S3) before S5 (protective film forming step) after S2 (protective substrate fixing step). However, there is no limitation thereto. For example, the flow passages may be formed in the flow passage substrate before S2 (protective substrate fixing step). Alternatively, the flow passages may be formed in the flow passage substrate after S5 (protective film forming step).

The liquid discharge head is not limited to the head based on the line type. The liquid discharge head may be any head based on the serial type (type or system in which the liquid is discharged to the discharge object from the nozzles while being moved in the scanning direction parallel to the paper width direction).

The discharge object is not limited to the recording paper, which may be, for example, cloth, substrates and the like.

The liquid discharged from the nozzles is not limited to the ink, which may be any arbitrary liquid (for example, any processing liquid or the like for coagulating or depositing any component contained in an ink).

The present teaching is not limited to the printer, which is also applicable, for example, to facsimiles, copying machines, and multifunction machines. Further, the present teaching is also applicable to any liquid discharging apparatus which is used for any way of use other than the image recording (for example, a liquid discharging apparatus for forming a conductive pattern by discharging a conductive liquid to a substrate).

What is claimed is:

1. A liquid discharge head comprising:

a flow passage substrate which is formed with a plurality of individual flow passages, the plurality of individual flow passages including a plurality of nozzles and a plurality of pressure chambers communicated with the plurality of nozzles respectively;

a plurality of actuators which are fixed to a surface of the flow passage substrate and which overlap with the plurality of pressure chambers respectively in an orthogonal direction orthogonal to the surface; and a protective substrate which is fixed to the surface and which covers the plurality of actuators, wherein the protective substrate has at least one wall portion for defining a plurality of actuator accommodating chambers which accommodate the plurality of actuators respectively, the wall portion overlaps in the orthogonal direction with a partition wall for partitioning two pressure chambers in the flow passage substrate, the wall portion being adhered to the surface via an adhesive portion composed of an adhesive, and a protective film, which has a moisture permeability lower than a moisture permeability of the adhesive, is formed at portions of the protective substrate and the adhesive portion which define the plurality of actuator accommodating chambers respectively, wherein the protective substrate has a first communication hole for communicating at least one of the plurality of actuator accommodating chambers with outside.

2. The liquid discharge head according to claim 1, wherein second communication holes for communicating the plurality of actuator accommodating chambers with each other are formed for the protective substrate, and the liquid discharge head further comprises a sealing member which is configured to seal the first communication hole.

3. The liquid discharge head according to claim 2, wherein the plurality of actuator accommodating chambers are arranged in an array direction orthogonal to the orthogonal direction, the protective substrate is formed with a plurality of first communication holes including the foregoing first communication hole, and the plurality of first communication holes are formed while being separated from each other in the array direction.

4. The liquid discharge head according to claim 2, wherein the plurality of actuator accommodating chambers are arranged in the array direction orthogonal to the orthogonal direction, the protective substrate is formed with a plurality of second communication holes including the foregoing second communication hole, and two of the second communication holes, which are adjacent to one another in the array direction, are not overlapped with each other in the array direction.

5. The liquid discharge head according to claim 4, wherein the plurality of second communication holes are arranged in a zigzag form in the array direction.

6. The liquid discharge head according to claim 2, wherein the second communication hole is formed at any portion of the wall portion except for one end adhered to the surface.

7. The liquid discharge head according to claim 2, wherein the plurality of actuator accommodating chambers are arranged in an array direction orthogonal to the orthogonal direction, and the second communication hole is formed over an entire length in the orthogonal direction of each of the plurality of actuator accommodating chambers at a position at which the second communication hole is not overlapped with the plurality of actuators in the array direction.

8. The liquid discharge head according to claim 1, wherein the protective film is composed of at least any one of tantalum oxide, hafnium oxide, and aluminum oxide.

9. The liquid discharge head according to claim 1, wherein a length in the orthogonal direction of each of the plurality of actuator accommodating chambers is not less than 100 μm.

10. The liquid discharge head according to claim 1, wherein the protective film is also formed on surfaces of the plurality of actuators.

11. The liquid discharge head according to claim 1, wherein the wall portion is composed of a photosensitive adhesive for constructing the adhesive portion.

12. The liquid discharge head according to claim 11, wherein the protective substrate has a plate portion which is composed of a member distinct from the wall portion, and the plate portion is connected to the other end disposed on a side opposite to one end of the wall portion adhered to the surface, the plate portion being overlapped in the orthogonal direction with the plurality of actuators.

13. A method for manufacturing a liquid discharge head, the method comprising:

an actuator forming step of forming a plurality of actuators on a surface of a flow passage substrate; and a protective substrate fixing step of fixing a protective substrate to the surface after the actuator forming step such that the plurality of actuators are covered with the protective substrate;

wherein the protective substrate has at least one wall portion for defining a plurality of actuator accommodating chambers each of which accommodates the actuator, the protective substrate is formed with a first communication hole for communicating at least one of the plurality of actuator accommodating chambers with outside and second communication holes for communicating the plurality of actuator accommodating chambers with each other, the protective substrate fixing step includes adhering the wall portion to the surface via an adhesive portion composed of an adhesive, such that the wall portion overlaps with a partition wall for partitioning two pressure chambers in the flow passage substrate in an orthogonal direction orthogonal to the surface, and the method further comprising:

a protective film forming step of forming a protective film which has a moisture permeability lower than a moisture permeability of the adhesive, at portions of the protective substrate and the adhesive portion which define the plurality of actuator accommodating chambers respectively, by injecting a gas from outside to inside of the protective substrate via the first communication hole, after the protective substrate fixing step; and a sealing step of sealing the first communication hole with a sealing member after the protective film forming step.

14. The method for manufacturing the liquid discharge head according to claim 13, wherein an atomic layer stacking method is used in the protective film forming step.

15. The method for manufacturing the liquid discharge head according to claim 14, wherein the protective film is composed of at least any one of tantalum oxide, hafnium oxide, and aluminum oxide.

16. The method for manufacturing the liquid discharge head according to claim 13, wherein a plurality of individual flow passages are formed in the flow passage substrate before the protective film forming step, the plurality of individual flow passages including a plurality of nozzle and a plurality of pressure chambers communicated with the plurality of nozzles respectively, and the protective film forming step including sealing the plurality of nozzles with another sealing member upon the injection of the gas.

17. The method for manufacturing the liquid discharge head according to claim 13, wherein the protective substrate fixing step includes forming, on the surface, the wall portion composed of a photosensitive adhesive for constructing the adhesive portion, and connecting a plate portion of the protective substrate to the other end disposed on a side opposite to one end of the wall portion adhered to the surface, the plate portion being overlapped in the orthogonal direction with the plurality of actuators.

* * * * *